United States Patent
Yellin et al.

(10) Patent No.: US 7,042,926 B2
(45) Date of Patent: May 9, 2006

(54) LOW COMPLEXITY MULTIUSER DETECTOR

(75) Inventors: Daniel Yellin, Raanama (IL); Kobby Pick, Modiin (IL); Yoni Perets, Petach-Tikva (IL)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 09/990,035

(22) Filed: Nov. 21, 2001

(65) Prior Publication Data

US 2003/0095588 A1 May 22, 2003

(51) Int. Cl.
*H04B 1/707* (2006.01)

(52) U.S. Cl. .................. 375/147; 375/130; 375/136; 375/361; 370/342; 370/335

(58) Field of Classification Search ................ 375/147, 375/148, 152, 146, 340, 341, 130, 136, 361; 370/441, 335, 208, 342
See application file for complete search history.

(56) References Cited

U.S. PATENT DOCUMENTS 6,034,986 A * 3/2000 Yellin .................. 375/148
6,289,041 B1 * 9/2001 Krasner .................. 375/152

FOREIGN PATENT DOCUMENTS

EP 1117185 7/2001

OTHER PUBLICATIONS

Multiple access interference resistant channel acquisition for wideband CDMA signals, Tripathi; Vehicular Technology Conference Proceedings, 2000. VTC 2000-Spring Tokyo. 2000 IEEE 51st, vol.: 2, May 15-18, 2000 p. 956-960 vol. 2.*
Ghauri, Irfan , et al., "Blind Channel Identification and Projection Receiver Determination For Multicode And Multirate Situations in DS-CDMA Systems", 2001 IEEE, XP-002233922, 2197-2200.
Tripathi, Vinayak , et al., "Multiple Access Interference Resistant Channel Acquisition for Wideband CDMA Signals", 2000 IEEE, 956-960.

* cited by examiner

*Primary Examiner*—Stephen Chin
*Assistant Examiner*—Ted M. Wang
(74) *Attorney, Agent, or Firm*—Schwegman, Lundberg, Woessner & Kluth, P.A.

(57) ABSTRACT

A multi-user detector for use in a CDMA receiver system includes a channel tap interpolator to generate interpolated channel taps for users of interest. The interpolated channel taps occur at integer multiples of a chip period from a sampling reference point. The channel tap interpolation allows detection processing to proceed in the chip domain, rather than in the sample domain, thus reducing the complexity of the multi-user solution significantly. In at least one approach, a number of low dimensionality "virtual" users are defined based on the recursive property of the spreading sequences. Solutions may then be developed for the virtual users using conventional detection (e.g., MMSE) techniques.

17 Claims, 4 Drawing Sheets though different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

LOW COMPLEXITY MULTIUSER DETECTOR

BACKGROUND OF THE INVENTION

One multiple access technique that is becoming increasingly popular in communication systems is code division multiple access (CDMA). In a direct sequence (DS) CDMA system, a plurality of substantially orthogonal codes (usually taking the form of pseudo-random noise sequences) are used to spread spectrum modulate user signals within the system. Each of the modulated user signals has an overlapping frequency spectrum with other modulated user signals in the system. However, because the underlying modulation codes are substantially orthogonal, each user signal can be independently demodulated by performing a correlation operation using the corresponding code.

For various reasons, the codes within the modulated user signals received in a CDMA-based receiver may not be fully orthogonal, thus resulting in interference between the different users. This interference is known as multiple access interference (MAI). In a conventional single-user CDMA detection strategy, the individual users are each separately detected without regard for interference from the other users. In a technique known as multi-user detection (MUD), on the other hand, information about multiple users is utilized jointly to better detect each individual user. MUD techniques can be implemented in connection with a wide variety of detector types including, for example, maximum-likelihood (ML) detectors, linear detectors, and subtractive interference cancellation detectors. One form of linear detector that shows promise for MUD implementation is the minimum mean-squared error (MMSE) detector. However, MMSE-based MUD detectors have traditionally been considered too complex for implementation within, for example, cellular-type communication systems. This complexity is in large part due to the multiplicity of users (and corresponding high dimensionality) that typically needs to be accounted for within such systems.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection The present invention relates to methods and structures for implementing MUD detection with relatively low complexity. The inventive principles are capable of, for example, reducing the complexity of MMSE-based MUD detection to a level that makes it practical for use within cellular-type wireless communication systems, in both the base station and the mobile. Many non-cellular applications also exist. The inventive principles may be implemented in any of a wide variety of different communication devices including, for example, base station transceivers, satellite transceivers, cellular telephones, pagers, personal digital assistants (PDA) or laptop computers with wireless transceiver functionality, and others. In at least one approach, the inventive principles are implemented in a manner that dispenses with the need for a rake-type receiver architecture. That is, the multipath combining and interference mitigation functions are taken into account in the generation of an MMSE de-spreading sequence, thus making rake-type receivers unnecessary. The inventive principles can also be used to support variable rate detection (i.e., detection in a system where different users have different spreading factors).

In one complexity reducing technique, actual channel taps associated with users of interest within a system are replaced by interpolated channel taps that occur at integer multiples of the chip period measured from a user-defined sampling reference point. This interpolation of the channel taps allows detection processing to proceed in the chip domain, rather than in the sampling domain, thus reducing the complexity of the detection process significantly. In another complexity reducing technique, a number of low dimensionality "virtual" users are defined within a receiver based on the recursive property of the spreading sequences of the actual users. In this manner, a cluster of actual users (each having a higher spreading factor) may be collapsed into a single low dimensionality virtual user (having a lower "base" spreading factor) to further reduce the complexity of the processing.

Figure 1:
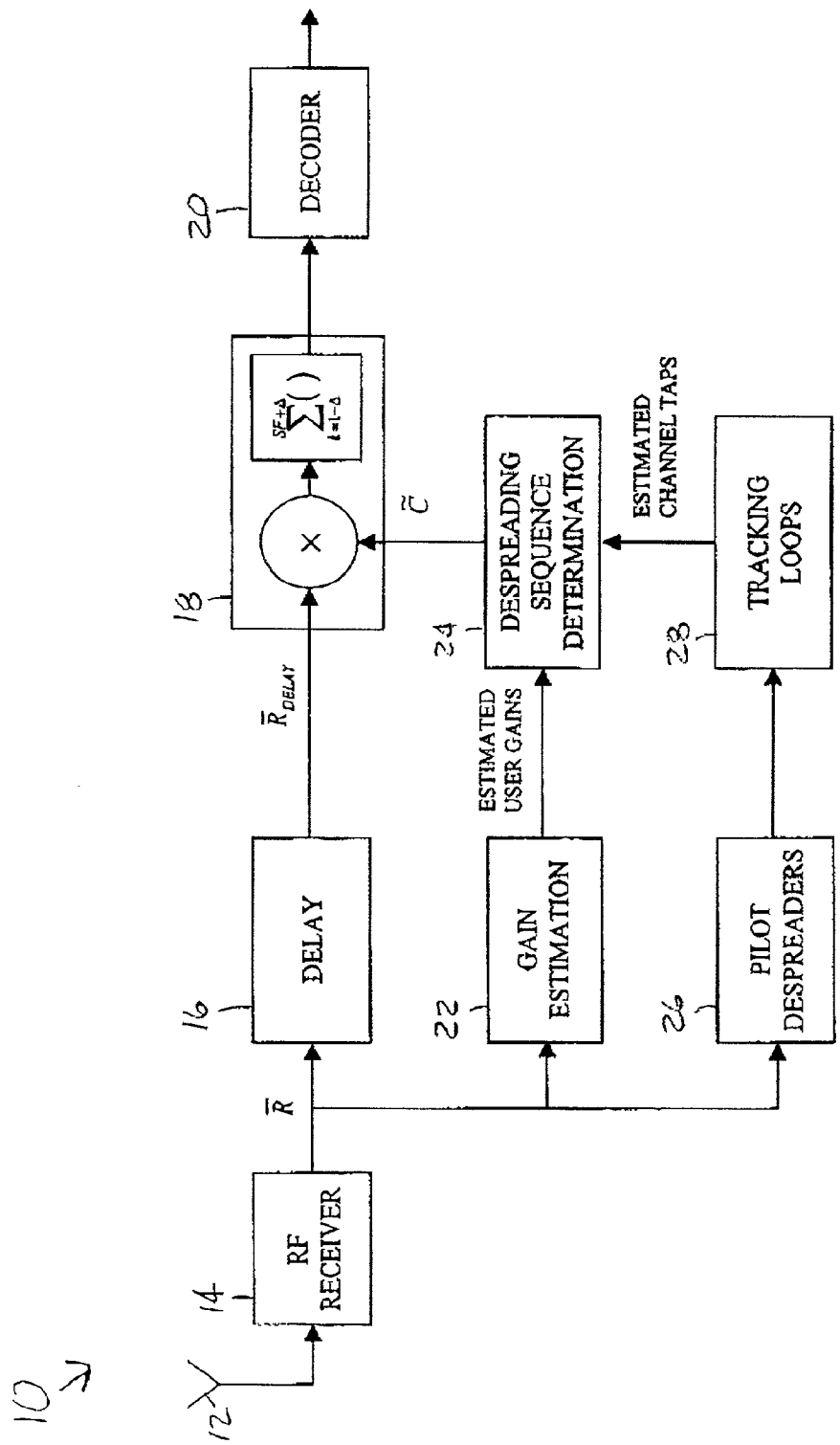
FIG. 1 is a block diagram illustrating a wireless receiver system that is capable of performing reduced complexity MMSE-based MUD detection in accordance with an embodiment of the present invention.

FIG. 1 is a block diagram illustrating a wireless receiver system 10 that is capable of performing reduced complexity MMSE-based MUD detection in accordance with an embodiment of the present invention. Many alternative receiver architectures are also possible in accordance with the present invention. During normal operation, the wireless receiver system 10 may receive communication signals associated with a number of different users. Some or all of these received signals may have overlapping frequency spectrums. The wireless receiver system 10 is capable of detecting information corresponding to one or more individual users from the composite receive signal (i.e., from the receive signal having overlapping signals from multiple users). In addition, the wireless receiver system 10 uses multi-user detection (MUD) techniques to detect the individual user information. That is, the receiver system 10 uses information about other users in the system to better detect each individual user.

As illustrated in FIG. 1, the wireless receiver system 10 includes: an antenna 12, a radio frequency (RF) receiver 14, a delay unit 16, a de-spreader 18, a decoder 20, a gain estimation unit 22, a de-spreading sequence determination unit 24, pilot de-spreaders 26, and tracking loops 28. The antenna 12 is operative for receiving RF communication signals from free space. Because CDMA is being used, RF signals associated with multiple users will typically be received by the antenna 12 simultaneously. In addition, the received RF signals will typically have overlapping frequency spectrums. If the wireless receiver system 10 is being implemented within a cellular base station, for example, the antenna 12 may receive signals from users within the same cell as the base station (i.e., users being serviced by the base station) as well as signals from users in other cells (i.e., users being serviced by other base stations). If the wireless receiver system 10 is being implemented within a mobile communicator in a cellular system, the antenna 12 may receive a signal from a servicing base station within the same cell as the communicator as well as signals from base stations within other cells. The signal received from each base station may include multiple overlapping signals associated with users being serviced by that base station.

All signals received by the antenna 12 that are associated with users other than a desired user (i.e., the user being detected) represent potential interference (MAI) within the receiver system 10. As described previously, each active user in the system will have a unique spreading sequence (or code) that can be used to distinguish that user's communications from the communications of other users. The spreading sequences of the various users are known within the wireless receiver system 10.

The overlapping signals received by the antenna 12 form a composite RF receive signal within the antenna 12 that is delivered to the RF receiver 14. The RF receiver 14 converts this composite receive signal to a baseband representation $\overline{R}$ using known techniques. The RF receiver 14 may include, for example, downconversion functionality, analog-to-digital conversion functionality, and/or any other functionality that may be required to generate the baseband receive signal $\overline{R}$. The de-spreader 18 is operative for de-spreading the receive signal $\overline{R}$ for a desired user using a de-spreading sequence $\tilde{C}$ generated by the de-spreading sequence determination unit 24. Typically, the de-spreading process will involve the multiplication of the receive signal $\overline{R}$ by the de-spreading sequence $\tilde{C}$ and the summation of the result over the symbol window. The symbol window may include a number of chips equal to the actual spreading factor (SF) of the desired user plus a user-defined number of chips ($\Delta$) at the beginning and end of the symbol to compensate for edge effects. As will be described in greater detail, most of the complexity reduction associated with the MMSE-based MUD detection process is achieved during the generation of the de-spreading sequence $\tilde{C}$. A delay unit 16 is provided to delay the receive signal $\overline{R}$ from reaching the de-spreader 18 until the de-spreading sequence $\tilde{C}$ has been generated.

The de-spreading sequence determination unit 24 generates the de-spreading sequence $\tilde{C}$ using, among other things, information gathered from the receive signal $\overline{R}$ by the gain estimation unit 22, the pilot de-spreaders 26, and the tracking loops 28. The gain estimation unit 22 estimates the gains associated with users of interest in the system. The pilot de-spreaders 26 and tracking loops 28 determine and track the channel taps associated with the users of interest in the system (e.g., the gain, phase, and delay of each multipath tap for each user and/or base station of interest). The users of interest are not necessarily all users for which signals have been received. For example, in one approach, the users of interest include the desired user(s) (the user(s) being detected) as well as the strongest interfering users. In a cellular telephone implementation, the users of interest may include all users being serviced by the same basestation as the cellular telephone as well as all users being serviced by the strongest neighboring basestations. Many other criteria for selecting users of interest are possible. Techniques for performing gain estimation and channel tracking are well known in the art.

If channel coding is being used, a channel decoder 20 may be provided (e.g., a Viterbi decoder, a turbo decoder, etc.) to remove the channel coding from the de-spread signal (i.e., the output signal of the de-spreader 18). If channel coding is not being used, a channel decoder is unnecessary; however, an optional slicer (not shown) may be provided to reproduce the transmitted bits from the de-spread signal. For example, if antipodal binary transmission is being employed, a slicer may be used that simply determines the sign of the de-spread symbols. In some applications, the wireless receiver system 10 may output information associated with only a single desired user. For example, if the receiver system 10 is implemented within a cellular telephone, the system 10 will typically output information for a single user associated with the telephone. In other applications, the wireless receiver system 10 may output information associated with multiple desired users. For example, if the receiver system 10 is implemented within a cellular base station, the system 10 will typically output information for all users currently being serviced by the base station. Because much of the calculation is identical for each user, there is typically little added complexity in generating outputs for additional users. Significantly, because most or all of the multipath combining and interference mitigation functions of the receiver system 10 are performed as part of the de-spreading sequence generation process, a rake-type receiver architecture is unnecessary.

Figure 2:
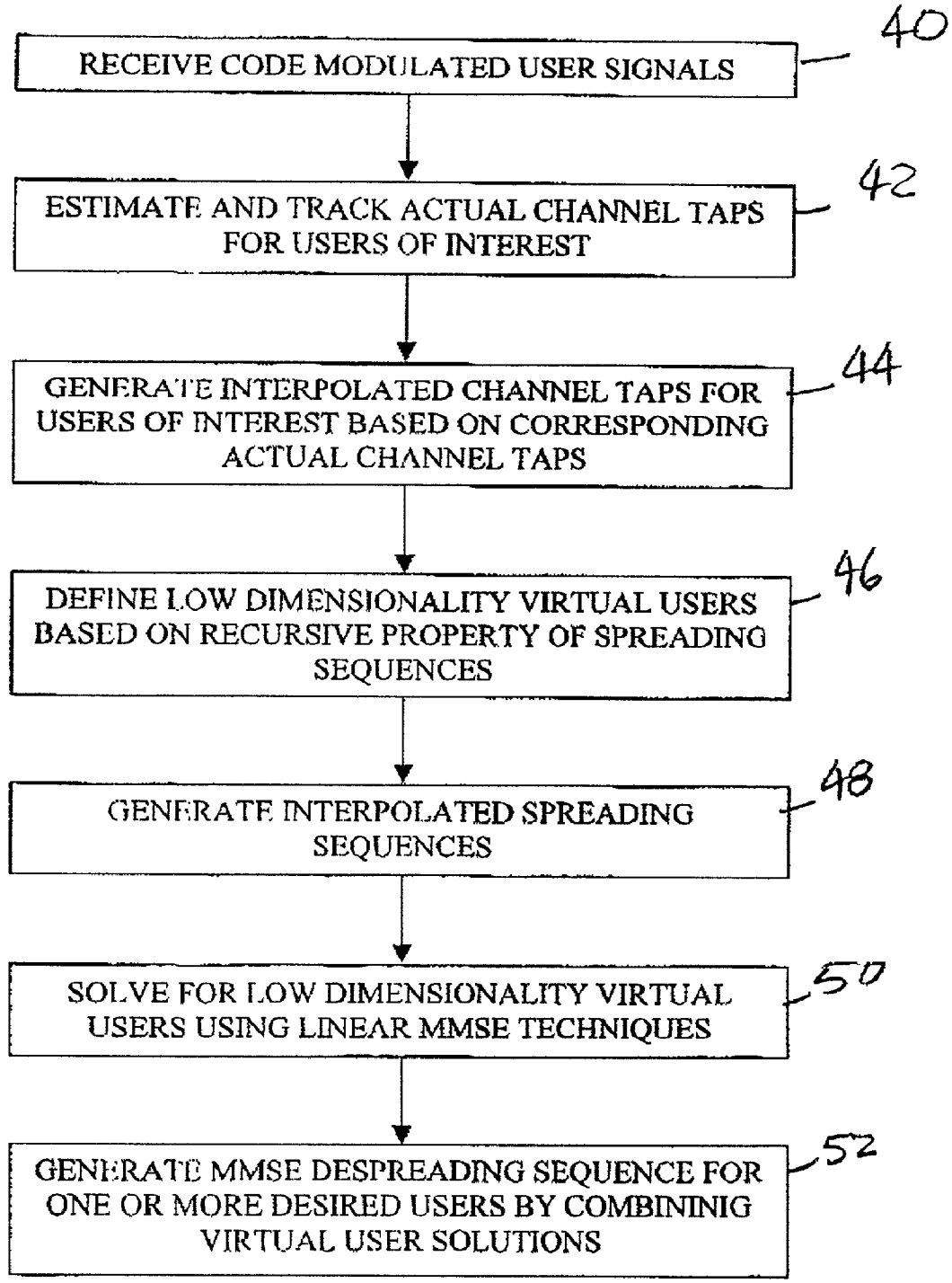
FIG. 2 is a flowchart illustrating a method for generating an MMSE de-spreading sequence in accordance with an embodiment of the present invention.

FIG. 2 is a flowchart illustrating a method for generating an MMSE de-spreading sequence $\tilde{C}$ in a MUD-based receiver in accordance with an embodiment of the present invention. The method may be implemented within, for example, the wireless receiver system 10 of FIG. 1 to generate the de-spreading sequence delivered to the de-spreader 18. Code modulated user signals having overlapping frequency spectrums are received that are associated with a number of users within a communication system (block 40). Actual channel taps are developed and tracked for users of interest in the communication system based on the received signals (block 42). In one possible implementation, the code modulated user signals are received directly from the users. This may be the case when the method is being implemented within, for example, a cellular base station. In this scenario, individual channel estimates are typically required for each of the users (i.e., for each distinct channel). In another possible implementation, the code modulated user signals are received from one or more base stations within a system, with each base station servicing one or more users. This may be the case when the method is being implemented within, for example, a mobile communicator in a cellular system. In this scenario, assuming a single transmit antenna is being used at each base station, a single channel estimate may only be required for each base station. This single channel estimate may then be utilized for multiple users associated with the base station.

If one or more of the channel taps associated with a user of interest (or corresponding base station) occurs at a non-integer multiple of a chip period relative to a user-defined sampling point, each of these channel taps is replaced by a sum of interpolated channel taps that occur at integer multiples of the chip period (block 44). By generating interpolated channel taps in this manner, subsequent detection processing can be performed at the chip rate rather than the higher "sampling" rate traditionally used to perform MMSE processing (the sampling rate is often 4–8 times the chip rate in a CDMA receiver using coherent detection). As is well known, MMSE processing requires the performance of matrix inversions to generate a de-spreading sequence. When chip-domain processing is utilized, the dimensionality of the matrix that needs to be inverted is reduced by a factor equal to the number of sample points per chip (i.e., OS). The number of calculations needed to invert a matrix is typically proportional to the cube of the matrix dimension. Thus, the complexity savings produced by performing the interpolation is on the order of $OS^3$.

Figure 3:
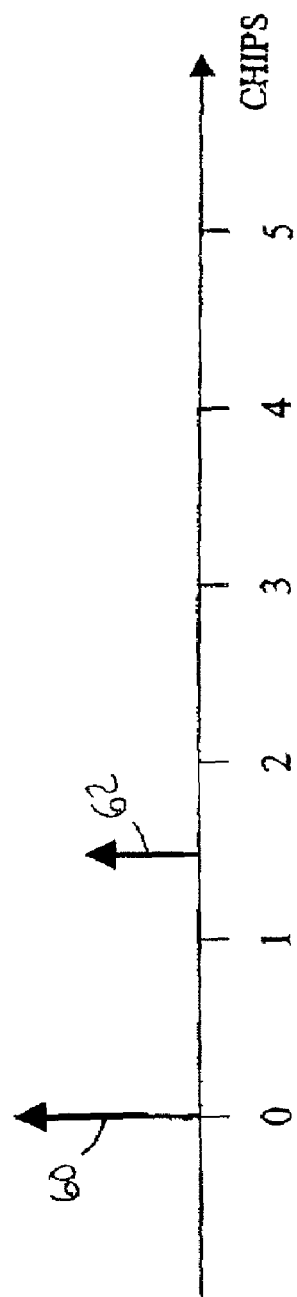
FIGS. 3 and 4 are timing diagrams illustrating the generation of interpolated channel taps in accordance with an embodiment of the present invention.
Figure 4:
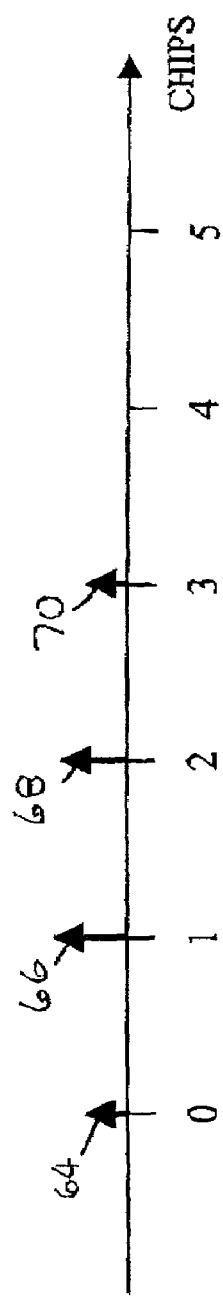

FIGS. 3 and 4 are timing diagrams illustrating the generation of interpolated channel taps in one possible scenario. In each of these diagrams, the horizontal axis represents integer chip intervals from a user-defined sampling point (labeled "0" in the diagrams). FIG. 3 illustrates the actual channel taps that may be determined for a given user of interest. As shown, a first actual channel tap 60 occurs at the user-defined sampling point. Thus, interpolated channel taps do not need to be determined for the first actual channel tap 60. A second actual channel tap 62, however, occurs at 1.5 chips from the user-defined sampling point. As illustrated in FIG. 4, the second actual channel tap 62 is replaced by 4 interpolated channel taps 64, 66, 68, 70, each including an appropriate gain and phase, that occur at integer multiples of the chip period (i.e., at 0, 1, 2, and 3 chips, respectively, from the reference sampling point). In effect, the actual channel associated with the user of interest is being replaced by a "virtual" channel that approximates the effects that the actual channel has on a transmitted signal. The first actual channel tap 60 and the four interpolated channel taps 64, 66, 68, 70 (as well as actual and/or interpolated channel taps associated with other users in the system) are subsequently used to develop a model of the received signal for use during MMSE processing. In one approach, the channel tap interpolations are performed using well known interpolation filter techniques. As one particular example, consider the case where the interpolator is obtained from the impulse response of a digital FIR low-pass filter with a cut-off frequency of $$\frac{\pi}{OS}.$$

The FIR length divided by OS is the interpolation order and the specific interpolation coefficients are $h(d+k \cdot OS)$ for $k=0,\pm1,\pm2,\ldots$ with $h(n)$ denoting the impulse response of that filter, and the initial offset d is determined from the fractional delay (i.e. the delay modulo the chip rate) between the actual channel tap to the reference sampling point. More sophisticated interpolations that take into account the shape of the transmit and receive filter responses may also be used.

A number of low dimensionality virtual users are defined based on the recursive property of the spreading sequences of the users (block 46). It is well known that certain spreading sequences (e.g., Walsh codes) have a recursive property that allows a code having a higher dimension to be treated as multiple repetitions of a code having a lower dimension. For example, a Walsh code having a dimension of 128 can typically be viewed as a repetition of four Walsh codes of dimension 32 (possibly requiring multiplication by a factor of −1). This property allows processing within a receiver to be carried out at a lower dimensionality even though the spreading codes of some or all of the users in the system have a higher dimensionality. In one approach, for example, a base spreading factor (SF_mmse) is first selected for use within a receiver. All users whose spreading factors are greater than this base spreading factor (i.e., SF>SF_mmse) are then collapsed into "virtual users" at the base spreading factor. Users having a spreading factor less than the base spreading factor (SF<SF_mmse) may not be allowed in the system. If such users do exist, they may be treated as noise. Alternatively, each user whose spreading factor is lower than SF_mmse can be treated as L=SF_mmse/SF equal gain virtual users with a spreading factor of SF_mmse, each having 1/L of the average power of the actual low spreading factor user. These L virtual users correspond to the L Walsh codes of dimension SF_mmse obtained by concatenating L replicas of the Walsh code of the actual low spreading factor user up to possible multiplications by −1. By collapsing high spreading factor actual users into smaller spreading factor virtual users, the actual user is effectively being viewed as having transmitted data symbols that are repeating (although possibly requiring multiplication by a factor of −1). By replacing a low spreading factor actual user with L virtual users, L consecutive data symbols of the actual user are effectively being viewed as one data symbol modulating a larger Walsh code (of dimension SF_mmse). The resulting SF_mmse Walsh code is obtained from the concatenation of modulated smaller dimension Walsh codes and therefore depends on the L modulating symbols. Since normally the transmitted symbols have an equal probability of occurrence, each of the possible L virtual users have a probability of occurrence of 1/L and an average power that is equal to the actual low spread factor user's power divided by L.

As an example of the above-described technique, suppose a base spreading factor of 2 is selected (SF_mmse=2) for a particular receiver. The Walsh codes of dimension 2 are:

$$1, 1 \qquad (1)$$

$$1, -1 \qquad (2)$$

Further suppose that there are users in the system having a spreading factor of 4. The Walsh codes of dimension 4 are:
(a) 1, 1, 1, 1
(b) 1, −1, 1, −1
(c) 1, 1, −1, −1
(d) 1, −1, −1, 1

The users with codes (a) and (c) would be viewed in the receiver as virtual users having a spreading factor of 2 (i.e., SF_mmse) with Walsh code (1) because the chip sequence they transmit is either [1, 1] or [−1, −1] (i.e., −1 multiplied by [1, 1]). At a certain instant in time, if only user (a) exists and is transmitting a data symbol "1," the user (a) will be viewed as a virtual user of SF=2 and Walsh code (1) that is transmitting two identical data symbols "1" (note that this is the repetition of data symbols described in the previous paragraph). The two identical data symbols "1" are referred to as the subsymbols of virtual user (a). The first subsymbol (i.e., the first "1") is associated with the first "phase" of the full Walsh code (i.e., the first 2 chips of the four chip sequence) and the second subsymbol (i.e., the second "1") is associated with the second "phase" of the full Walsh code (i.e., the second 2 chips of the four chip sequence). In general, the number of phases (and the number of subsymbols) associated with a user will equal the actual spreading factor of the user divided by the base spreading factor.

If only user (c) exists at a particular instant in time, and user (c) is transmitting a data symbol "1," then user (c) will be viewed as a virtual user of SF=2 and Walsh code (1) that is transmitting a first subsymbol "1" and a second subsymbol "−1." If user (a) and user (c) coexist and each transmit a "1," they will be viewed as a single virtual user whose first subsymbol is 1+1=2 (i.e., the sum of the subsymbols of users who collapse to Walsh code (1) during the first phase) and whose second subsymbol is 1−1=0 (i.e., the sum of the subsymbols of users who collapse to Walsh code (1) during the second phase). In general, therefore, a virtual user is the equivalent user at the base spreading factor (SF_mmse) that may represent contributions from up to N users having spreading factor "actual SF," where N=actual SF/SF_mmse.

Interpolated spreading sequences are next generated for each of the users at the base spreading factor (SF_mmse) (block 48). This can include both the virtual users defined above as well as any actual users having the base spreading factor. The interpolated spreading sequences are generated based upon, among other things, the interpolated channel taps described previously. The interpolated spreading sequences are sequences that approximate the actual spreading sequences of the users of interest as seen by the receiver. The interpolated spreading sequences allow the received signal to be approximated by a sum of the interpolated spreading sequences, each modulated by a corresponding user's data symbols (and associated gains). In this regard, each interpolated spreading sequence may consist of a weighted sum of chip spaced replicas of the original spreading sequence for the corresponding user of interest. The weighting may be determined using the gain and phase information corresponding to the channel taps of the virtual channel (which can include actual channel taps and/or interpolated channel taps, as described previously) associated with the user of interest.

Conventional linear MMSE techniques are next employed to solve for low dimensionality virtual users of interest (block 50). That is, an individual de-spreading sequence is generated for each subsymbol associated with a virtual user of interest by minimizing a mean square error for the subsymbol in a conventional fashion. For example, if the base spreading factor of the receiver is 2 and a desired user has an actual spreading factor of 4, then two consecutive MMSE problems are solved at the base spreading factor to provide an individual de-spreading sequence for each of the two subsymbols. The interpolated spreading sequences generated previously are used during the MMSE solution process. Also used during the MMSE process are the statistics of the virtual users which may be computed by taking into account, for example, the true spreading codes, the true Walsh codes, the true symbol constellation, and an estimation of the true gains of the users. Because of the low spreading factor of the users and because the processing is being performed in the chip domain, the MMSE solutions for the virtual users of interest will typically be significantly less complex than a corresponding sample domain MMSE solution for an actual user. To further reduce complexity, polynomial matrix approximations to the inversion operation required by the MMSE may be employed.

An MMSE de-spreading sequence is next generated for one or more desired users (i.e., the actual user(s) being detected) by combining corresponding virtual user solutions (block 52). That is, the individual de-spreading sequences for each corresponding subsymbol of a virtual user of interest are combined to generate a de-spreading sequence $\tilde{C}$ for the full symbol of an actual user. One simple way to combine the subsymbol solutions into the despreading sequence $\tilde{C}$ is by time concatenating the subsymbol MMSE solution into one longer sequence, adding those terms that overlap in time. As an example consider the case where the ratio of the actual SF to SF_mmse is two. In such a case, there are two subsymbol MMSE solutions, denoted by $C_1$ and $C_2$, and the combined spreading sequence $\tilde{C}$ is obtained as follows:

$$\{\tilde{C}\}_i \equiv \begin{cases} \{C_1\}_i & ; \text{if } 1 \leq i \leq \text{SF\_mmse} \\ \{C_1\}_i + \{C_2\}_{i-\text{SF\_mmse}} & ; \text{if } \text{SF\_mmse}+1 \leq i \leq \text{SF\_mmse}+2\cdot\Delta \\ \{C_2\}_{i-\text{SF\_mmse}} & ; \text{if } \text{SF\_mmse}+2\cdot\Delta+1 \leq i \leq 2\cdot(\text{SF\_mmse}+\Delta) \end{cases}$$

Another alternative which is more demanding in terms of computation power, is to do an MMSE combining of the subsymbol solutions into the despreading sequence, using well known MMSE techniques. In either case, the despreading sequence $\tilde{C}$ that is generated is an approximation of the de-spreading sequence that would be generated by performing a full dimensionality, sample domain MMSE solution. However, it has been found that detection performance levels approaching those of systems implementing a full dimensionality, sample domain MMSE solution are possible using the above-described method, at significantly reduced complexity.

The above-described method is capable of performing reduced complexity MMSE detection even without the formation of virtual users. That is, interpolated spreading sequences can be generated for full dimensionality users and then conventional MMSE techniques may be used to solve for the desired user(s) using these interpolated spreading sequences. Because interpolated channel taps have been generated and the processing is done in the chip domain, the MMSE processing will be significantly less complex than processing in the sample domain. By defining low. dimensionality virtual users, as described above, additional reduction in complexity is possible. In addition, the channel tap interpolation techniques described above can also be used in connection with other types of detectors to reduce the complexity of such detectors including, for example, other linear multi-user detectors, Rake receivers, and even non-linear interference cancellers.

Figure 5:
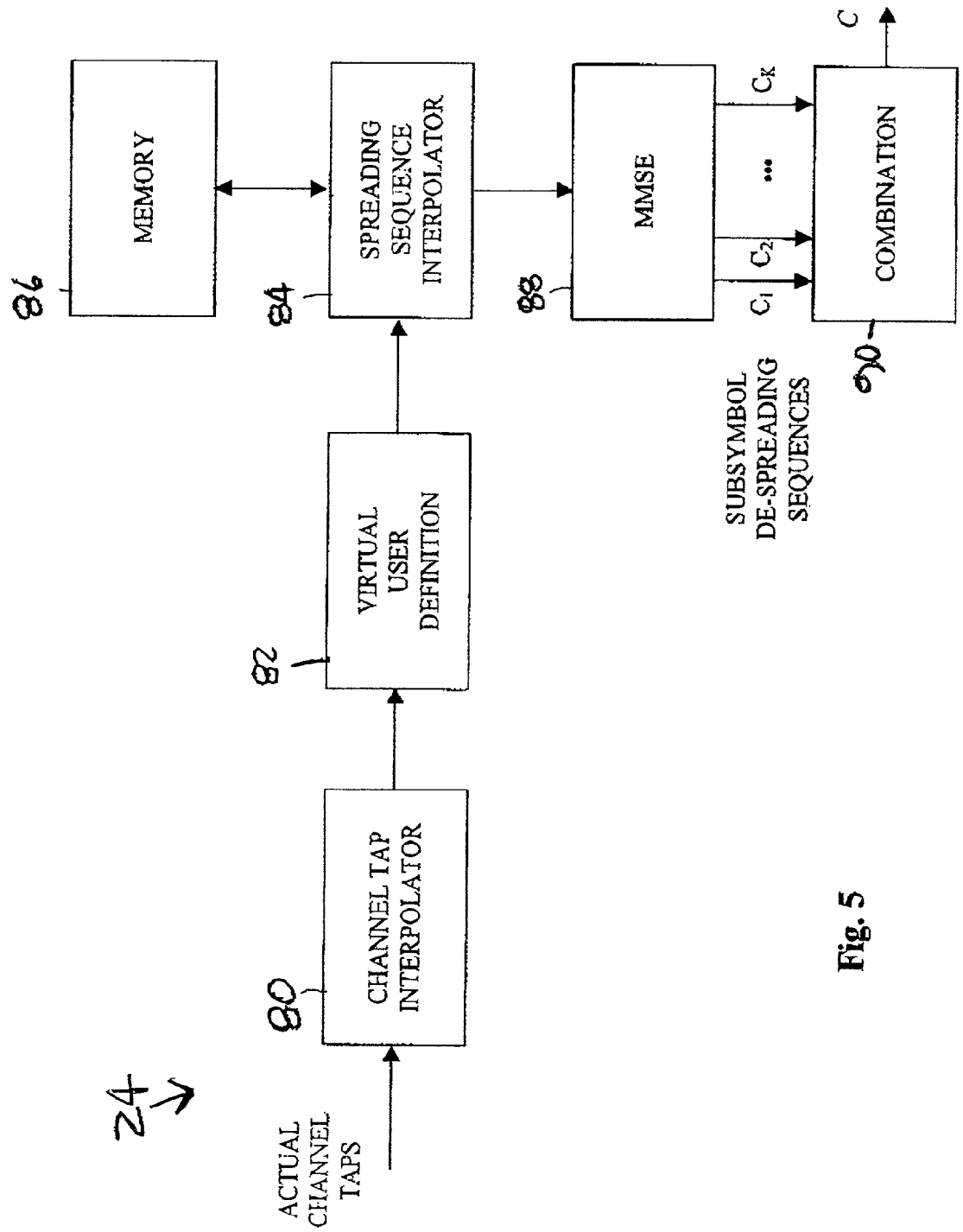
FIG. 5 is a block diagram illustrating functionality within a de-spreading sequence determination unit in accordance with an embodiment of the present invention.

FIG. 5 is a block diagram illustrating functionality within a de-spreading sequence determination unit 24 in accordance with an embodiment of the present invention. As illustrated, the de-spreading sequence determination unit 24 includes: a channel tap interpolator 80, a virtual user definition unit 82, a spreading sequence interpolator 84, a memory 86, an MMSE 88, and a combination unit 90. The channel tap interpolator 80 receives actual channel tap information for a number of users and/or base stations of interest. For all actual channel taps that occur at non-integer multiples of a chip period from a sampling point, the channel tap interpolator 80 generates equivalent interpolated channel taps that occur at integer multiples of the chip period. The virtual user definition unit 82 is operative for defining the low spreading factor virtual users that will be processed in the system. As described previously, actual users of interest having spreading factors greater than a base spreading factor will be collapsed into virtual users at the base spreading factor. The virtual user definition unit 82 may also generate virtual user statistics for delivery to the MMSE 88 based on, for example, the true spreading codes, the true Walsh codes, the true symbol constellation, and gain estimates of the virtual users.

The spreading sequence interpolator 84 generates interpolated spreading sequences for the virtual users and actual users having the base spreading factor. These interpolated spreading sequences approximate the actual spreading sequences of the users as seen by the receiver. To generate the interpolated spreading sequences, the spreading sequence interpolator 84 uses the original spreading sequences of the users of interest, which are stored in the memory 86. As described previously, each interpolated spreading sequence may consist of a weighted sum of chip spaced replicas of the original spreading sequence for the corresponding user of interest, where the weighting is determined based on the gain and phase information of the channel taps of the corresponding virtual channel. The interpolated spreading sequences are delivered to the MMSE 88. The MMSE 88 uses the interpolated spreading sequences to generate individual de-spreading sequences (e.g., $C_1$–$C_K$) for a plurality of subsymbols of interest. The combination unit 90 then combines the individual de-spreading sequences to generate an MMSE de-spreading sequence $\tilde{C}$ for the full symbol of an actual (desired) user. The de-spreading sequence $\tilde{C}$ may then be delivered to a de-spreader (e.g., de-spreader 18 of FIG. 1) to de-spread a corresponding receive signal.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A multi-user detector comprising:
a channel estimator to estimate actual channel taps associated with users of interest based on a receive signal;
a channel tap interpolator to generate interpolated channel taps for a first user of interest when at least one actual channel tap associated with said first user of interest occurs at a non-integer multiple of a chip period from a sampling reference point, said interpolated channel taps occurring at integer multiples of the chip period from the sampling reference point; and
a virtual user definition unit to define a plurality of low dimensionality virtual users based on a recursive property of spreading sequences associated with said user of interest, each low dimensionality virtual user having a number of associated subsymbols within a corresponding symbol period.

2. The multi-user detector of claim 1, comprising:
a spreading sequence interpolator to generate interpolated spreading sequences for low dimensionality virtual users based on interpolated channel taps.

3. The multi-user detector of claim 2, comprising:
an minimum mean-squared error (MMSE) unit to generate individual de-spreading sequences corresponding to sub symbols of at least one virtual user of interest.

4. The multi-user detector of claim 3, comprising:
a combination unit to generate a de-spreading sequence for an actual user by combining individual de-spreading sequences generated by said MMSE unit.

5. A method for use in generating a de-spreading sequence for a desired user within a code division multiple access (CDMA) receiver, comprising:
estimating actual channel taps for users of interest based on a receive signal that includes code modulated signal components for multiple users, said code modulated signal components having overlapping frequency spectrums;
generating interpolated channel taps for a user of interest when at least one actual channel tap associated with the user of interest occurs at a non-integer multiple of a chip period from a sampling reference point, said interpolated channel taps occurring at integer multiples of said chip period from said sampling reference point; and
defining a plurality of low dimensionality virtual users based on a recursive property of spreading sequences associated with said users of interest, each low dimensionality virtual user having a number of associated subsymbols within a corresponding symbol period.

6. The method of claim 5, further comprising:
generating interpolated spreading sequences for virtual users based on said interpolated channel taps.

7. The method of claim 6, further comprising:
generating individual de-spreading sequences for subsymbols associated with at least one virtual user of interest using said interpolated spreading sequences.

8. The method of claim 7, wherein:
generating individual de-spreading sequences includes using minimum mean$_{13}$ squared error (MMSE) techniques.

9. The method of claim 7, further comprising:
combining individual de-spreading sequences associated with said at least one virtual user of interest to generate a de-spreading sequence for a desired user.

10. A receiver system for use in a CDMA-based communication system, comprising:
a de-spreader to de-spread a receive signal using a de-spreading sequence associated with a desired user, said receive signal including code modulated signal components for multiple users that have overlapping signal spectrums;
a de-spreading sequence determination unit to generate said de-spreading sequence, said de-spreading sequence determination unit including a channel tap interpolator to determine interpolated channel taps for a user of interest when at least one actual channel tap associated with the user of interest occurs at a non-integer multiple of a chip period from a sampling reference point, wherein said interpolated channel taps occur at integer multiples of said chip period from the sampling reference; and
said de-spreading sequence determination unit further comprises a virtual user definition unit to define low dimensionality virtual users based on a recursive property of spreading sequences of said users of interest, said low dimensionality virtual users each having multiple subsymbols within a corresponding symbol period.

11. The receiver system of claim 10 wherein:
said de-spreading sequence determination unit further comprises a spreading sequence interpolator to generate interpolated spreading sequences for low dimensionality virtual users based on interpolated channel taps.

12. The receiver system of claim 11 wherein:
said de-spreading sequence determination unit further comprises an minimum mean-squared error (MMSE) unit to generate individual de-spreading sequences for subsymbols of at least one virtual user of interest.

13. The receiver system of claim 12 wherein:
said de-spreading sequence determination unit further comprises a combination unit to combine individual de-spreading sequences generated by said MMSE unit to generate said de-spreading sequence for said desired user.

14. An article comprising machine-accessible media having associated data, wherein the data, when accessed, results in a machine for performing a method of generating a de-spreading sequence for a desired user in a code division multiple access (CDMA) system, said method comprising:
estimating actual channel taps for users of interest based on a receive signal that includes code modulated signal components for multiple users, said code modulated signal components having overlapping signal spectrums;
generating interpolated channel taps for a user of interest when at least one actual channel tap associated with the user of interest occurs at a non-integer multiple of a chip period from a sampling reference point, said interpolated channel taps occurring at integer multiples of said chip period from said sampling reference point;
generating interpolated channel taps includes generating interpolated channel taps for each user of interest having at least one actual channel tap that occurs at a non-integer multiple of a chip period from the sampling reference point; and
defining a plurality of low dimensionality virtual users based on a recursive property of spreading sequences associated with said users of interest, each low dimensionality virtual user having a number of associated subsymbols within a corresponding symbol period.

15. The article of claim 14 wherein said method further comprises:
generating interpolated spreading sequences for low dimensionality virtual users based on said interpolated channel taps.

16. The article of claim 15 wherein said method further comprises:
generating individual de-spreading sequences for subsymbols associated with at least one low dimensionality virtual user of interest using said interpolated spreading sequences.

17. The article of claim 16 wherein said method further comprises:
combining individual de-spreading sequences associated with said at least one low dimensionality virtual user of interest to generate a de-spreading sequence for the desired user.

* * * * *

UNITED STATES PATENT AND TRADEMARK OFFICE
CERTIFICATE OF CORRECTION

PATENT NO. : 7,042,926 B2
APPLICATION NO. : 09/990035
DATED : May 9, 2006
INVENTOR(S) : Yellin et al.

It is certified that error appears in the above-identified patent and that said Letters Patent is hereby corrected as shown below:

On Title Page, Item (75), in "Inventors", in column 1, line 1, delete "Raanama" and insert -- Raanana --, therefor.

On Title Page, Item (56), under "Foreign Patent Documents", in column 1, line 1, after "7/2001" insert -- H04B/1/707 --.

In column 9, line 63, in Claim 3, delete "sub symbols" and insert -- subsymbols --, therefor.

In column 10, line 31, in Claim 8, delete "mean$_{13}$ squared" and insert -- mean-squared --, therefor.

In column 10, line 37, in Claim 10, delete "CDMA" and insert -- code division multiple access (CDMA) --, therefor.

Signed and Sealed this

Twenty-sixth Day of September, 2006

JON W. DUDAS
*Director of the United States Patent and Trademark Office*